(12) United States Patent
Kim et al.

(10) Patent No.: US 7,797,451 B2
(45) Date of Patent: Sep. 14, 2010

(54) A/V STREAM-FORWARDING SYSTEM AND METHOD FOR FORWARDING A/V STREAMS FROM DATA NETWORK TO IEEE1394 NETWORK

(75) Inventors: Jun-hyeong Kim, Anyang-si (KR); Moon-jeong Choi, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1320 days.

(21) Appl. No.: 11/291,897

(22) Filed: Dec. 2, 2005

(65) Prior Publication Data

US 2006/0174304 A1 Aug. 3, 2006

(30) Foreign Application Priority Data

Jan. 31, 2005 (KR) ............... 10-2005-0008614

(51) Int. Cl.
*G06F 15/16* (2006.01)
(52) U.S. Cl. .............. 709/246; 709/203; 709/230
(58) Field of Classification Search .......... 709/203, 709/216–219, 231–232, 237, 246, 249; 725/51, 725/74, 82, 83, 105, 109–110, 116, 135, 725/146–147; 375/240.1
See application file for complete search history.

(56) References Cited

U.S. PATENT DOCUMENTS 6,216,152 B1* 4/2001 Wong et al. ............. 709/203
6,505,255 B1* 1/2003 Akatsu et al. ........... 709/239
2005/0204393 A1* 9/2005 Bopardikar et al. ....... 725/81

FOREIGN PATENT DOCUMENTS

KR 10-2000-0032824 A 6/2000
KR 10-2003-0047006 A 6/2003

* cited by examiner

*Primary Examiner*—Thu Nguyen
*Assistant Examiner*—Nam Tran
(74) *Attorney, Agent, or Firm*—Sughrue Mion, PLLC

(57) ABSTRACT

An A/V stream-forwarding system forwarding A/V streams of a data network to an IEEE 1394 network and a method therefor. The A/V stream-forwarding system has a media server having an interface with the data network and providing the A/V streams; a transcoder receiving the A/V streams provided by the media server through the data-network interface, and transcoding the A/V streams into A/V streams in a predetermined format supported by an IEEE 1394 network; and; a display device receiving and reproducing the A/V streams of the transcoder in the predetermined format that is supported by the IEEE 1394 network. Accordingly, the A/V streams of the data network are converted into A/V streams in a predetermined format that is supported by the IEEE 1394 network, regardless of diverse A/V stream formats, codecs, transmission protocols, transmission control protocols, and so on, of the data network.

32 Claims, 5 Drawing Sheets

A/V STREAM-FORWARDING SYSTEM AND METHOD FOR FORWARDING A/V STREAMS FROM DATA NETWORK TO IEEE1394 NETWORK

CROSS-REFERENCE TO RELATED APPLICATIONS

This application claims benefit under 35 U.S.C. § 119 from Korean Patent Application No. 2005-08614 filed on Jan. 31, 2005 in the Korean Intellectual Property Office, the entire contents of which are incorporated herein by reference.

BACKGROUND OF THE INVENTION

1. Field of the Invention

The present invention relates to forwarding A/V streams between heterogeneous networks, and, more particularly, to an A/V stream-forwarding system and a method for forwarding A/V streams from an IP network to an IEEE1394 network.

2. Description of the Related Art

The A/V (audio/video) networks may be classified into IP-based data networks and IEEE 1394 networks being Non-IP networks. The devices that typically use the data networks are computers, and the devices that typically use the IEEE 1394 networks are digital TVs, digital camcorders, and so on.

The IEEE 1394 networks have data transfer rates of 100 Mbps, 200 Mbps, and 400 Mbps, and have the guaranteed Quality of Service (QoS). However, the IEEE 1394 network supports restricted file formats, and typically supports the file format of MPEG2 Transport Streams. On the other hand, the data network has a data transfer rate slower than the IEEE 1394 network and does not guarantee the QoS. However, the data network has an advantage in that it can support diverse types of transport stream formats, codecs, transmission protocols, and transmission control protocols.

Recently, despite efforts for integration of the data network and the IEEE 1394 network, there still exist difficulties in integrating the data network and the IEEE 1394 network due to the lack of linkage between the data network and the IEEE 1394 network. The lack of linkage between the two networks, at least in part, is attributed to the differences of QoS, IP, A/V streams, and so on.

SUMMARY OF THE INVENTION

One aspect of the present invention is to solve the above-described drawbacks and other problems associated with the conventional arrangement. An aspect of the present invention is to provide an A/V stream-forwarding system and a method for forwarding A/V streams from an IP networks to the IEEE 1394 network so that users can watch the A/V streams of a data network on a display device connected to the IEEE 1394 network.

Another aspect of the present invention is to provide an A/V stream-forwarding system and a method for converting A/V streams of an IP network into certain A/V streams of a predetermined format which can be supported in the IEEE 1394 network, regardless of diverse A/V stream formats, codecs, transmission protocols, transmission control protocols, and so on of the data network.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

According to an aspect of the present invention, an A/V stream-forwarding system is provided. The A/V stream-forwarding system includes a media server which provides A/V streams and which has an interface for a data network; a transcoder receiving the A/V streams provided by the media server through the data-network interface, and transcoding the A/V streams into A/V streams in a predetermined format supported by an IEEE 1394 network; and a display device receiving and reproducing the A/V streams from the transcoder in the predetermined format supported by the IEEE 1394 network.

The media server may include a first device information-providing unit providing the display device with device information of the media server; a storage unit storing A/V files and mobile codes; a mobile code-providing unit providing predetermined resources in a mobile-code format in response to a request from the display device or the transcoder; an A/V stream-providing unit converting the A/V files of the storage unit into A/V streams in response to a request of the transcoder, and providing the transcoder with the converted A/V streams; and a first IP network interface unit performing IP-network communications with the transcoder.

The mobile codes may include a user interface, format parser, codec, transmission protocol, and transmission control protocol created in a java language. The mobile codes are resources supported by the media server.

The mobile code-providing unit, may, upon request, provide the transcoder with a format parser, codec, transmission protocol, and transmission control protocol that the media server has.

If the display device requests for a user interface, the mobile code-providing unit may provide a predetermined user interface having a content-searching function.

The transcoder includes a second device information-providing unit providing the display device with device information of the transcoder; an UI-providing unit providing a predetermined user interface upon request from the display device; an A/V stream-processing unit receiving and processing a request of the display device for A/V streams, and, if the transcoder is re-configured based on resources that the media server supports, requesting A/V stream transmission from the media server; an A/V stream-converting unit transcoding predetermined A/V streams provided by the media server into MPEG2 transport streams; an A/V stream-transmitting unit sending the transcoded MPEG2 transport streams to the display device.

Device information of the transcoder may include a 1394 network address and a list of services for the transcoder.

The A/V stream-processing unit may request a list of resources that the media server can support, check whether the transcoder has the list of resources, and, based on the check, request resources that are missing in the transcoder.

The transcoder may further include a transcoding device-reconfiguring unit reconfiguring the transcoder to perform transcoding based on predetermined resources supported by the media server.

The A/V stream-converting unit may decode A/V streams of the media server in a predetermined format into raw data by using a predetermined codec supported by the media server, store the raw data in a buffer, and encode the raw data into the MPEG2 transport streams.

The transcoder may include an IEEE 1394 network interface unit providing interface with the display device; an IP network interface unit providing interface with the media server; and an IP packet-forwarding unit forwarding IP packets from the display device to the media server and/or vice versa.

The predetermined user interface may provide functions necessary for the display device to request A/V streams from the media server.

The display device may include a device search unit searching a media server that provides A/V streams; a UI-requesting/processing unit requesting the media server and the transcoder for a user interface necessary for controlling respective devices, and running the predetermined user interface on a virtual machine; an A/V stream request unit requesting the transcoder for predetermined A/V streams; an A/V stream reception/reproduction unit decoding and reproducing the predetermined A/V streams received from the transcoder; and a display unit displaying the reproduced predetermined A/V streams on a screen.

The user interface from the media server may include a content search function.

The user interface provided from the transcoder may include functions necessary to request A/V streams from the media server.

If predetermined A/V streams are requested from the transcoder, the A/V stream request unit provides the transcoder with information that includes an 1394 network address of the display device, an IP address of a media server storing desired contents, and contents desired for reproduction.

The predetermined A/V streams may be the MPEG2 transport streams.

The display device may further include an IEEE 1394 network interface unit performing interface with the transcoder.

A media server includes a first device information-providing unit providing a display device with device information of the media server; a storage unit storing A/V files and mobile codes; a mobile code-providing unit providing the predetermined resources in a mobile-code format in response to a request from the display device or a transcoder; an A/V stream-providing unit converting the A/V files of the storage unit into A/V streams upon request for A/V stream transmission from the transcoder, and providing the transcoder with the converted A/V streams; and a first IP network interface unit performing IP-network communications with the transcoder.

The mobile codes may include a user interface, format parser, codec, transmission protocol, and transmission control protocol created in a java language. The mobile codes are resources supported by the media server.

The mobile code-providing unit may, upon request from the transcoder, provide the transcoder with a format parser, codec, transmission protocol, and transmission control protocol that the media server has.

If the display device requests a user interface, the mobile code-providing unit provides a predetermined user interface having a content-searching function.

A transcoder includes a second device information-providing unit providing a display device with device information of a transcoder; a UI-providing unit providing a predetermined user interface upon request from the display device; an A/V stream-processing unit receiving and processing a request of the display device for A/V streams, and, if the transcoder is re-configured based on resources supported by a media server, requesting A/V stream transmission from the media server; an A/V stream-converting unit transcoding predetermined A/V streams provided by the media server into MPEG2 transport streams; an A/V stream-transmitting unit sending the display device the transcoded MPEG2 transport streams.

Device information of the transcoder may include a 1394 network address and a list of services for the transcoder.

The A/V stream-processing unit may request a list of resources supported by the media server, check whether the transcoder has the list of resources, and based on the check, request resources that the transcoder does not have.

The transcoder may further include a transcoding device-reconfiguring unit reconfiguring the transcoder in order to perform transcoding based on predetermined resources supported by the media server.

The A/V stream-converting unit may decode A/V streams of the media server in a predetermined format into raw data by using a predetermined codec supported by the media server, store the raw data in a buffer, and encode the raw data into the MPEG2 transport streams.

The transcoder may further include an IEEE 1394 network interface unit providing interface with the display device; an IP network interface unit providing interface with the media server; and an IP packet-forwarding unit forwarding IP packets from the display device to the media server or vice versa.

The predetermined user interface may provide functions necessary for the display device to request the media server for A/V streams.

An A/V stream-forwarding method includes requesting A/V stream transmission relating to certain contents; transcoding A/V streams of a media server into predetermined A/V streams supported by an IEEE 1394 network, based on predetermined resources supported by the media server, and sending the predetermined A/V streams; and decoding and reproducing the transcoded predetermined A/V streams on a screen.

The predetermined resources may be a parser for a predetermined A/V format, codec, transmission protocol, and transmission control protocol, which are supported by the media server.

The requesting of the A/V stream transmission may include sending device information of the transcoder to the display device, where the transcoder and the display device are connected to each other; searching for a media server from which the A/V streams are obtained; providing the device information from the media server found during the search; searching for and selecting certain contents desired for reproduction, by using a user interface for contents search provided by the media server; and requesting A/V streams for the certain contents desired for reproduction, by using a user interface provided by the transcoder.

The transcoding may include requesting a list of resources supported by the media server; checking whether the transcoder has the resources. Based on the results of the check, if the list of resources supported by the media server is provided in response to the request, requesting resources, which the transcoder does not have, out of the resources supported by the media server; re-configuring the transcoder if the media server provides the transcoder with predetermined resources in response to the request, and requesting A/V stream transmission; and transcoding the received A/V streams by using a predetermined codec supported by the media server if the A/V streams are transmitted.

The A/V stream-transcoding may decode the received A/V streams into raw data by using the predetermined codec supported by the media server, store the raw data, and encode the raw data into MPEG2 transport streams.

BRIEF DESCRIPTION OF THE DRAWINGS

The above and/or other aspects and features of the present invention will be more apparent by describing in detail exemplary embodiments of the present invention with reference to the accompanying drawings. In the drawings, the same reference characters denote analogous elements, in which.

DETAILED DESCRIPTION OF THE EXEMPLARY EMBODIMENTS

Hereinafter, the exemplary embodiments of the present invention will be described with reference to the accompanying drawings.

Figure 1:
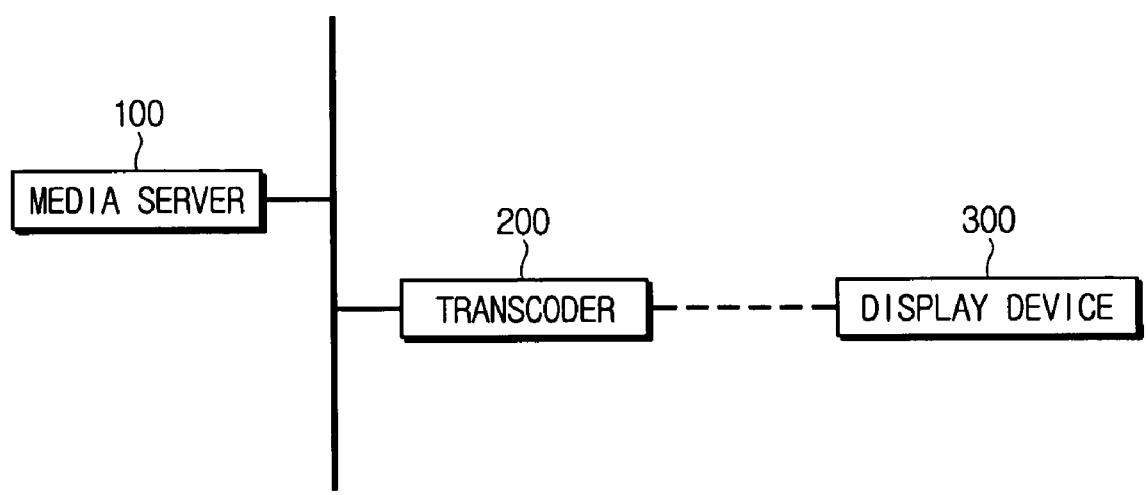
FIG. 1 is a view schematically showing an A/V stream-forwarding system for forwarding A/V streams of a data network to an IEEE 1394 network according to an exemplary embodiment of the present invention.

FIG. 1 is a view schematically showing an A/V stream-forwarding system for forwarding A/V streams of a data network to an IEEE 1394 network according to an exemplary embodiment of the present invention. In FIG. 1, the A/V stream-forwarding system has a media server 100, a transcoder 200, and a display device 300. The media server 100 and the transcoder 200 are connected to an IP network, which is a data network. The transcoder 200 and the display device 300 are connected to the IEEE 1394 network. In an exemplary embodiment, the physical layer of the IEEE 1394 network is connected through the IEEE 1394, the transmission layer of the same is connected through the IEEE 1394 and the IP over 1394. The physical layer of the data network is connected through the Ethernet, Wireless LAN, and so on, and the transmission layer of the same is connected through the TCP/IP.

The media server 100 is a device providing A/V streams. For example, the media servers 100 can be a personal computer. FIG. 1 shows only one media server by way of an example, but the number of the media server 100 can be one or more. That is, one of ordinary skill in the art will understand that the number of media servers is not limited to one.

If the transcoder 200 requests A/V streams from the media server 100, the media server 100 provides the transcoder 200 with A/V stream format, codec corresponding thereto, transmission protocol, transmission control protocol, and so on, which the media server 100 supports. The media server 100 sends the A/V stream format, codec, transmission protocol, transmission control protocol, and so on, in a mobile code format created in the JAVA™ programming language and so on.

The transcoder 200 operates as a controller of the media server 100, and forwards the A/V streams between the data network and the IEEE 1394 network. Further, the transcoder 200 converts the A/V streams provided by the media server 100 into the MPEG2 transport streams, and provides the MPEG2 transport streams to the display device 300 through the IEEE 1394 network. The A/V streams provided by the media server 100 are converted into the MPEG2 transport streams, regardless of the type of the A/V streams. Further, the transcoder 200 serves as an IP bridge forwarding IP packets between the data network and the IEEE 1394 network.

The display device 300 is connected to the transcoder 200 through the IEEE 1394 network. The display device 300 serves as a controller of the media server 100 and transcoder 200, and communicates with the media server 100 and/or the transcoder 200 by using the IEEE 1394 protocol or the IP over 1394 protocol.

Figure 2:
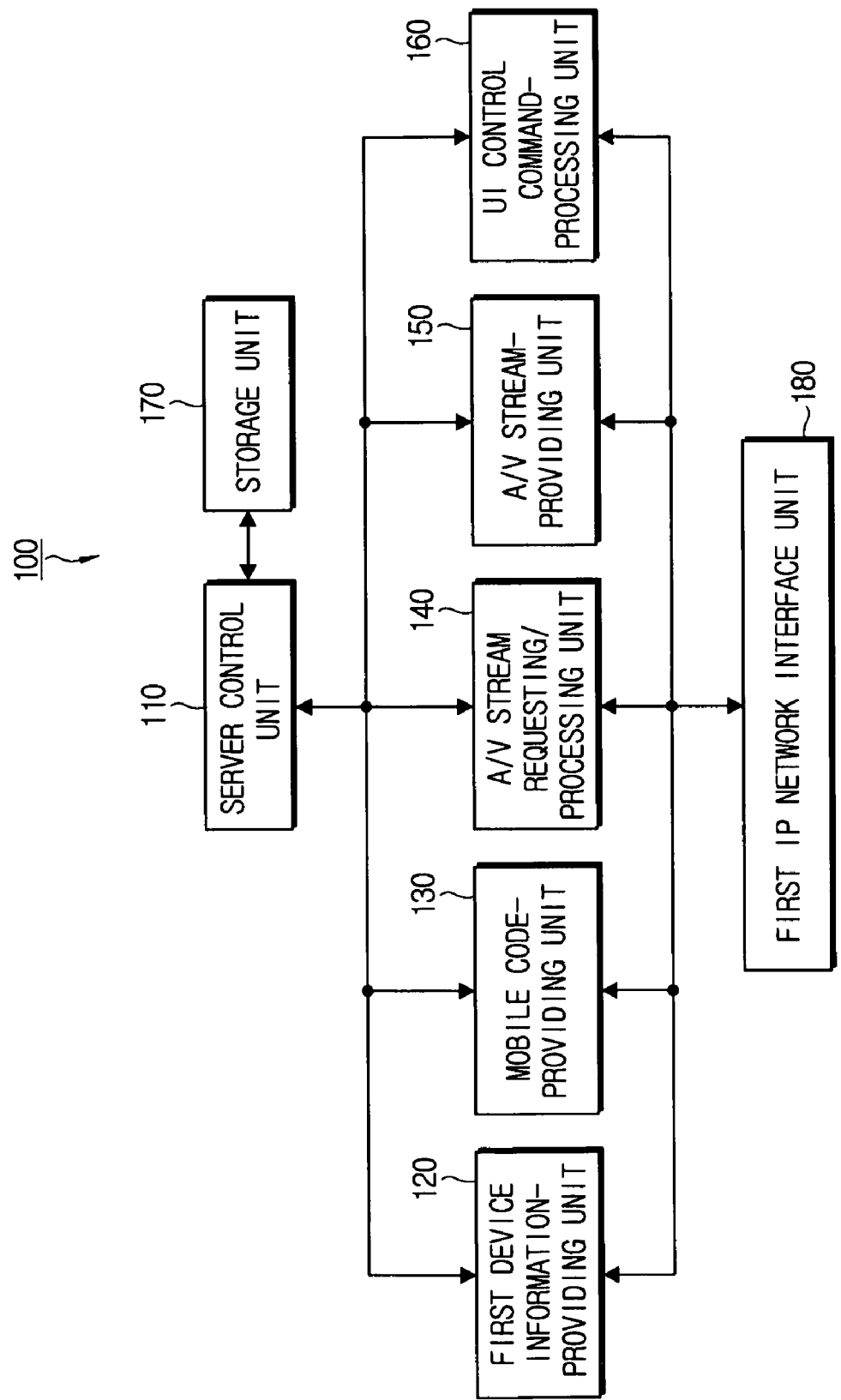
FIG. 2 is a block diagram showing a structure of a media server according to an exemplary embodiment of the present invention.

FIG. 2 is a block diagram showing an exemplary structure of the media server 100. In FIG. 2, the media server 100 has a server control unit 110, a first device information-providing unit 120, a mobile code-providing unit 130, an A/V stream request-processing unit 140, an A/V stream-providing unit 150, an UI (user interface) control command-processing unit 160, a storage unit 170, and a first IP network interface unit 180.

The server control unit 110 performs the overall controls of the media server 100.

If the display device 300 searches for a device capable of providing A/V streams, the first device information-providing unit 120 sends, to the display device 300, IP packets containing device information of the media server 100 such as IP address, a list of services, and so on of the media server 100.

If the display device 300 or the transcoder 200 requests a mobile code, the mobile code-providing unit 130 provides the display device 300 or the transcoder 200 with the requested mobile code. The mobile codes refer to user interfaces, format parsers, codecs, transmission protocols, transmission control protocols, and so on. The mobile codes are created in the JAVA™ language and so on, and can be downloaded, dynamic-loaded, and run on virtual machines of the transcoder 200 and the display device 300.

If the transcoder 200 requests the A/V streams, the A/V stream request-processing unit 140 negotiates with the transcoder 200 regarding necessary jobs for the A/V stream transmission and decoding.

If the transcoder 200 requests the A/V stream transmissions by using a predetermined transmission control protocol, the A/V stream-providing unit 150 converts an A/V file stored in the storage unit 170 into the A/V streams, and provides the converted A/V streams to the transcoder 200. If a control command is issued from a user interface provided on the display device 300, the UI control command-processing unit 160 receives and processes the command.

The storage unit 170 stores various A/V files, and stores the parsers, codecs, transmission protocols, transmission control protocols, and so on, which are in the mobile code format supported by the media server 100. The first IP network interface unit 180 performs IP network communications with the transcoder 200.

Figure 3:
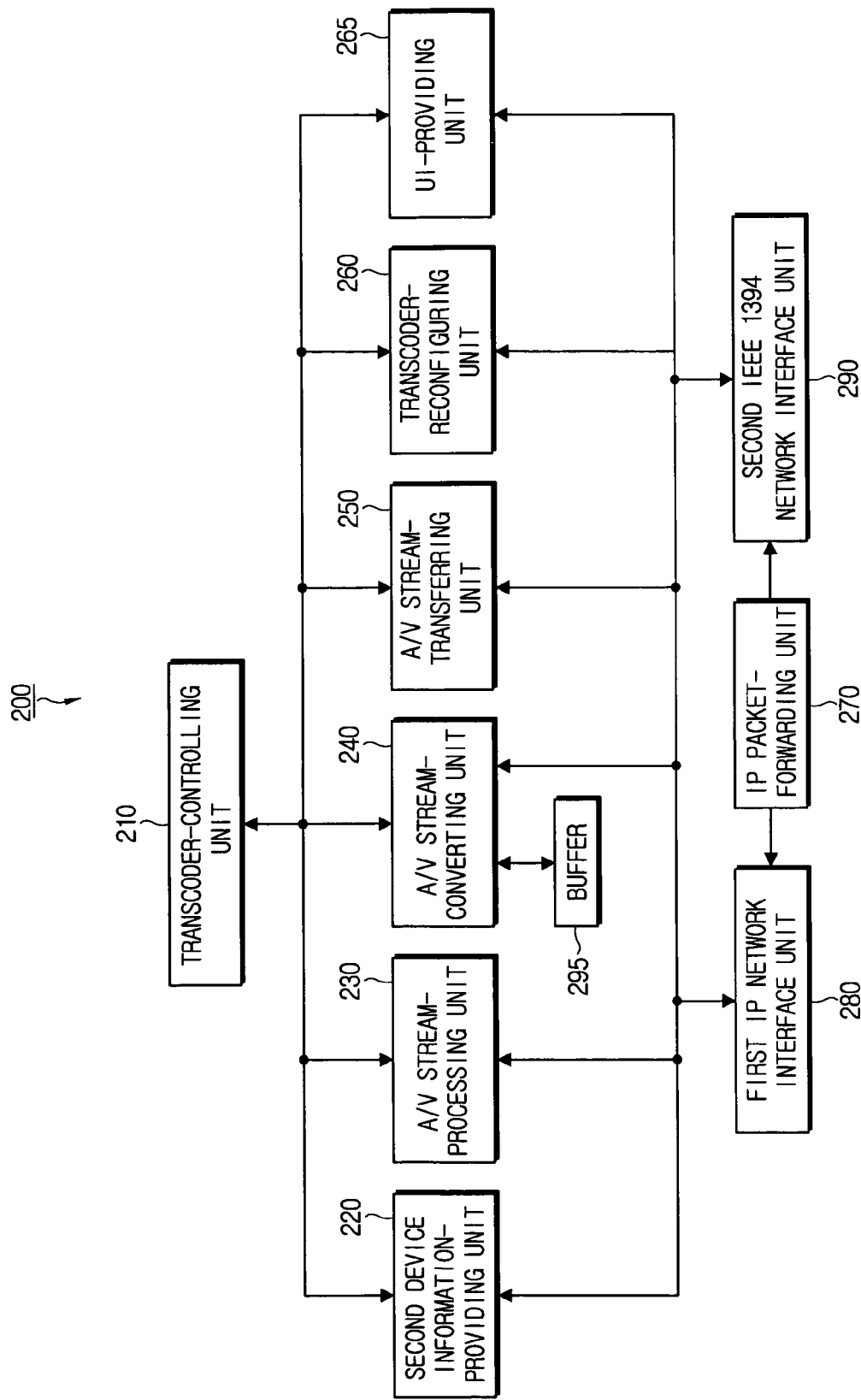
FIG. 3 is a block diagram showing a structure of a transcoder according to an exemplary embodiment of the present invention.

FIG. 3 is a block diagram illustrating an exemplary structure of the transcoder 200.

In FIG. 3, the transcoder 200 has a transcoder control unit 210, a second device information-providing unit 220, an A/V stream-processing unit 230, an A/V stream-converting unit 240, an A/V stream-transferring unit 250, a transcoder-reconfiguring unit 260, an UI-providing unit 265, an IP packet-forwarding unit 270, and a first IP network interface unit 280, a second IEEE 1394 network interface unit 290, and a buffer 295.

The transcoder control unit 210 performs the overall control of the transcoder 200. The second device information-providing unit 220 provides device information of the transcoder 200 to the display device 300.

The A/V stream-processing unit 230 receives and processes an A/V stream request of the display device 300, and requests A/V streams from the media server 100. If the media server 100 sends the A/V streams of an IP network in response to the A/V stream request of the transcoder 200, the A/V stream-processing unit 230 receives, from the media server 100, the A/V streams of the IP network.

The A/V stream-converting unit 240 transcodes the A/V streams of the IP network received from the media server 100 into MPEG2 streams. In particular, the A/V stream-converting unit 240 decodes the A/V streams received from the media server 100 into raw data, and temporarily stores the raw data in the buffer 295. Next, the A/V stream-converting unit 240 encodes the raw data stored in the buffer 295 into the MPEG2 transport streams.

The A/V stream-transferring unit 250 sends the transcoded MPEG2 streams to the display device 300 through the second IEEE 1394 network interface unit 290.

The transcoder-reconfiguring unit 260 receives, from the media server 100, the mobile codes necessary for transcoding, runs the mobile codes on a virtual machine, and reconfigures the transcoder 200 based on the mobile codes. For mobile codes transferred from the media server 100, parsers, codecs, transmission protocols, transmission control protocols, and so on are provided.

If the display device 300 requests a user interface for controlling the transcoder 200, the UI-providing unit 265 provides the display device 300 with the user interface. The user interface provided by the UI-providing unit 265 of the transcoder 200 includes essential, additional, and other functions for allowing the display device 300 to request A/V streams from the media server 100.

The IP packet-forwarding unit 270 forwards IP packets between the media server 100 connected to an IP network and the display device 300 connected to the IEEE 1394 network.

The first IP network interface unit 280 is connected to the media server 100 and carries out communications between the transcoder 200 and the media server 100 via the data network, and the second IEEE 1394 network interface unit 290 is connected to the display device 300 and carries out communications between the transcoder 200 and the display device 300 via the IEEE 1394 network.

Figure 4:
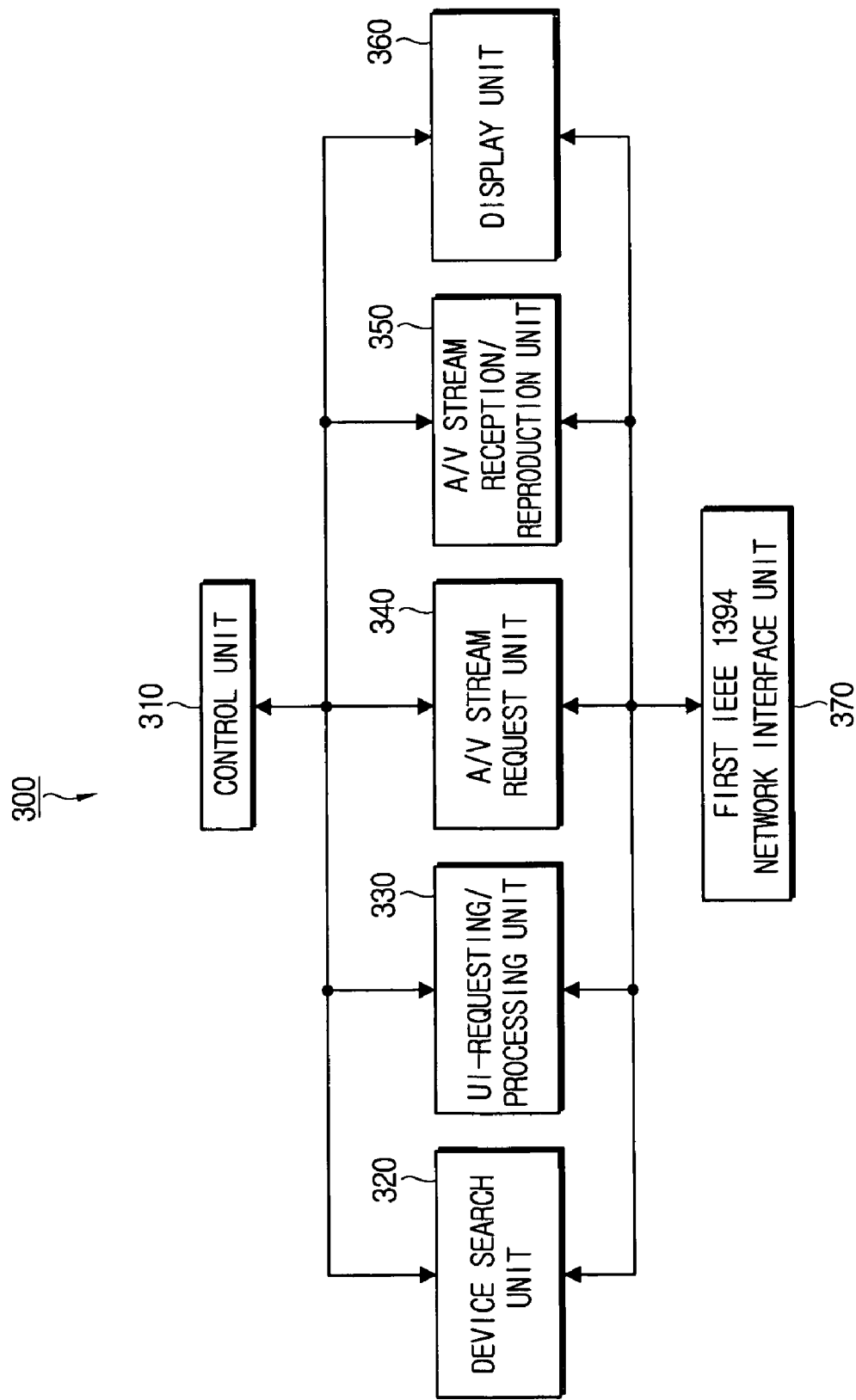
FIG. 4 is a block diagram showing a structure of a display device according to an exemplary embodiment of the present invention.

FIG. 4 is a block diagram of an exemplary display device 300.

In FIG. 4, the display device 300 has a control unit 310, a device search unit 320, a UI-requesting/processing unit 330, an A/V stream request unit 340, an A/V stream reception/reproduction unit 350, a display unit 360, and a first IEEE 1394 network interface unit 370.

The control unit 310 performs the overall controls of the display device 300.

The device search unit 320 multicasts search IP packets for searching for the media server 100, so as to search for the media server 100 that is capable of providing A/V streams.

The UI-requesting/processing unit 330 requests user interfaces from the media server 100 and the transcoder 200. The requested user interfaces are necessary to control respective devices. The UI-requesting/processing unit 330 also controls the provided user interfaces to run on a virtual machine.

The A/V stream request unit 340 requests A/V streams from the transcoder 200. The A/V stream request unit 340 provides the transcoder 200 with information that includes its own 1394 network address, an IP address of the media server 100 storing the requested contents, and contents information that is to be reproduced.

The A/V stream reception/reproduction unit 350 receives MPEG2 transport streams sent from the transcoder 200 through the IEEE 1394 network, and controls the received MPEG2 transport streams so as to be reproduced on the display unit 360.

The IEEE 1394 network interface unit 370 carries out communications between the transcoder 200 and the display device 300 through the IEEE 1394 network.

Figure 5:
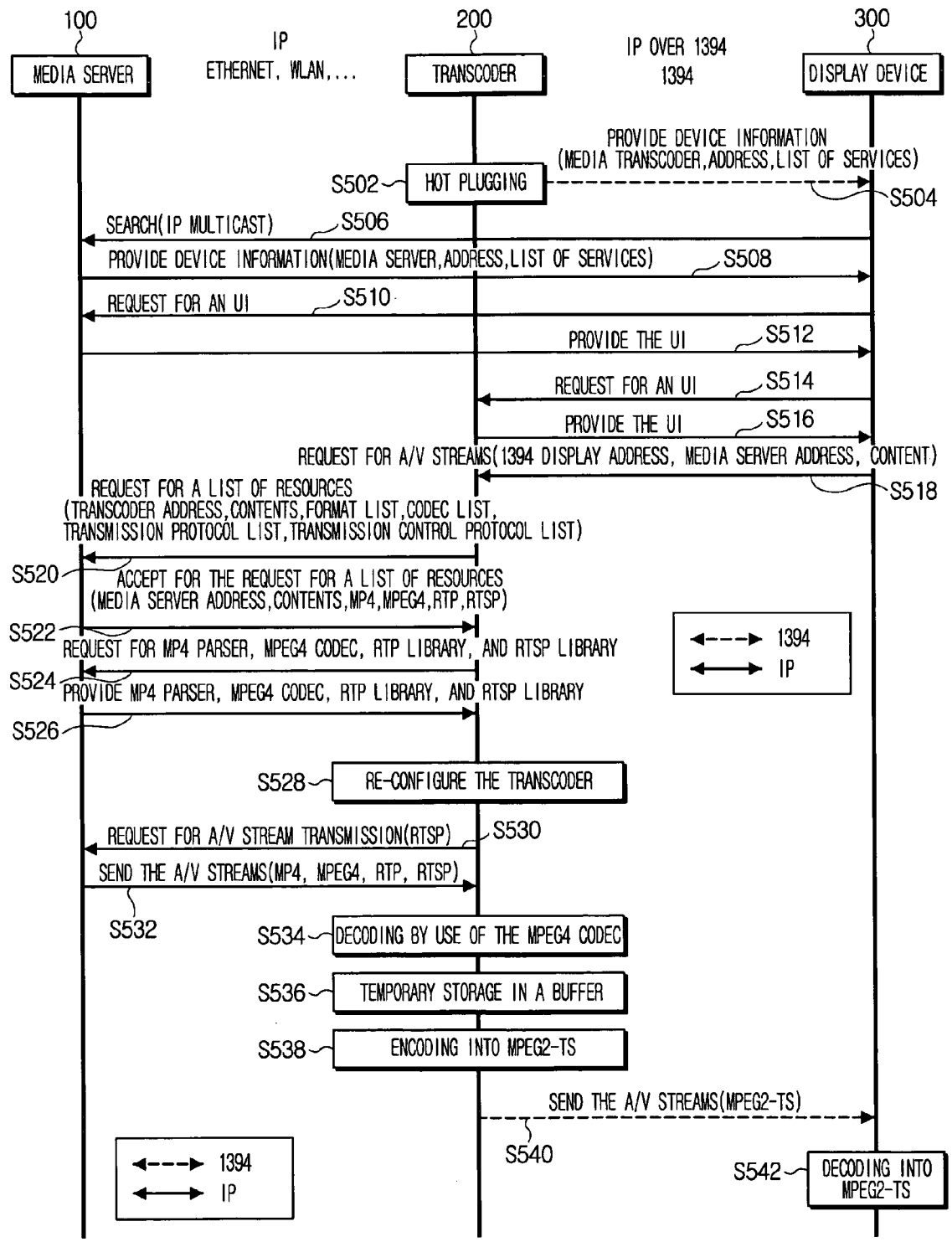
FIG. 5 is a flow chart illustrating an A/V stream-forwarding method for forwarding A/V streams of the data network to the IEEE 1394 network according to an exemplary embodiment of the present invention.

FIG. 5 is a flow chart illustrating an A/V stream-forwarding method, in which A/V streams are forwarded from a data network to the IEEE 1394 network according to an exemplary embodiment of the present invention. In this exemplary embodiment, the media server 100 supports MP4, MPEG4 codec, RTP, and RTSP are a A/V stream format, codec, transmission protocol, and transmission control protocol.

In FIG. 2 to FIG. 5, if the transcoder 200 and the display device 300 are connected to the IEEE 1394 network, there occurs a hot-plugging (in operation S502). The transcoder 200 sends its device information of 1394 network address, a list of services, and so on to the display device 300 (in operation S504).

Next, the device search unit 320 of the display device 300 multicasts search IP packets for searching for the media server 100, and searches for the media server 100 capable of providing A/V streams (in operation S506). The search IP packets are sent to the media server 100 via the IP packet-forwarding unit 270 of the transcoder 200.

If the media server 100 receives the search IP packets, the first device information-providing unit 120 of the media server 100 sends the IP packets containing the device information of the media server 100 such as IP address, a list of services, and so on, to the display device 300 (in operation S508). The IP packets containing the device information of the media server 100 are sent to the display device 300 via the IP packet-forwarding unit 270 of the transcoder 200 analogous to the search IP packets.

If the media server 100 provides the device information, the UI-requesting/processing unit 330 of the display device 300 requests the media server 100 to provide a user interface for controlling the media server 100 (in operation S510). The user interface provided by the media server 100 includes a contents list search function and other functions.

In response to a user interface request of the display device 300, the mobile code-providing unit 130 of the media server 100 provides the display device 300 with a user interface created in the mobile code so that a viewer of the display device 300 can search a contents list provided by the media server 100 (in operation S512). If the user interface is provided on the display device 300, the UI-requesting/processing unit 330 of the display device 300 runs the user interface on a virtual machine. A user searches the contents list provided on the user interface for his or her desired contents.

Further, the UI-requesting/processing unit 330 of the display device 300 requests the transcoder 200 to send a user interface providing functions necessary for requesting A/V streams from the media server 100 (in operation S514). In response to the request of the display device 300, the UI-providing unit 265 of the transcoder 200 provides the display device 300 with the user interface (in operation S516). The user interface, which is provided by the UI-providing unit 265 of the transcoder 200, includes essential and additional functions for the display device 300 to request A/V streams from the media server 100.

On the other hand, if a user selects his or her desired contents, the A/V stream request unit 340 of the display device 300 requests the A/V streams for the selected contents from the transcoder 200 (in operation S518). If the request for the A/V streams is made to the transcoder 200, the display device 300 provides the transcoder 200 with its 1394 network address, IP address of the media server 100 storing the desired content, and content information to be reproduced.

If the A/V streams are requested by the display device 300, the A/V stream-processing unit 230 requests from the media server 100 a list of resources supported by the media server 100 (in operation S520). The transcoder 200 provides the media server 100 with information of its own IP address, contents to reproduce, a list of A/V stream formats that the transcoder 200 can support, codec list, transmission protocol list, transmission control protocol list, and so on.

If the transcoder 200 requests a list of resources supported by the media server 100, the A/V stream request-processing unit 140 of the media server 100 sends the transcoder 200 an acceptance response (in operation S522). The response of the media server 100 includes its own IP address, contents to be provided, and A/V stream format information such as MP4, codec information such as MPEG4, transmission protocol information such as RTP, transmission control protocol information such as RTSP, and so on, which are supported by the media server 100.

The A/V stream-processing unit 230 of the transcoder 200 checks whether the transcoder 200 has resources supported by the media server 100. That is, the transcoder 200 checks whether it has a parser corresponding to the A/V stream format, codec supported by the media server 100, transmission protocol supported by the media server 100, transmission control protocol supported by the media server 100, and so on.

If the check indicates that the transcoder 200 does not have even one of the above resources, the transcoder 200 cannot perform transcoding. Therefore, the A/V stream-processing unit 230 of the transcoder 200 requests resources that it does not have from the media server 100, in order to perform the transcoding (in operation S524). For example, if the transcoder 200 does not have resources related to MP4 files, the transcoder 200 requests MP4 parser, MPEG4 codec, RTP library, RTSP library, and so on from the media server 100.

If there is a transmission request from the transcoder 200 for resources in order to performing the transcoding, the mobile code-providing unit 130 of the media server 100 sends the resources supported by the mobile code-providing unit 130 to the transcoder 200 (in operation S526).

Through the above exemplary process, if the transcoder 200 has all the resources supported by the media server 100, the transcoder-reconfiguring unit 260 re-configures the transcoder 200 by using a parser for the A/V stream format, codec, transmission protocol, transmission control protocol, and so on, which are supported by the media server 100 (in operation S528).

If the transcoder 200 is re-configured based on the resources that the media server 100 supports, the A/V stream-processing unit 230 requests, from the media server 100, A/V streams for the contents such as videos selected by a user, based on the transmission control protocol supported by the media server 100 (in operation S530).

The A/V stream-providing unit 150 of the media server 100 sends to the transcoder 200 the A/V streams for the contents such as videos selected by the user, using an A/V stream format, codec, transmission protocol, and transmission control protocol, which the A/V stream-providing unit 150 itself supports (in operation S532). For example, the media server 100 sends, to the transcoder 200, the A/V streams for the contents such as videos selected by the user, using the MP4 format, MPEG4 codec, RTP transmission protocol, RTSP transmission control protocol, which the media server 100 itself supports.

The A/V stream-converting unit 240 of the transcoder 200 decodes the A/V streams sent from the media server 100 into raw data, using a codec for decoding the A/V stream format received from the media server 100 (in operation S534). The decoded raw data is temporarily stored in the buffer 295 (in operation S536).

Next, the A/V stream-converting unit 240 of the transcoder 200 encodes the raw data stored in the buffer 295 into MPEG2 transport streams (in operation S538), and sends the MPEG2 transport streams to the display device 300 (in operation S540).

The A/V stream reception/reproduction unit 350 of the display device 300 decodes the MPEG2 transport streams received from the transcoder 200, and outputs the decoded MPEG2 transport streams to the display unit 360 (in operation S542). Accordingly, users can watch the A/V streams of the IP network through the display device 300 such as a digital television connected to the IEEE 1394 network.

In an exemplary embodiment of the present invention, the A/V streams are forwarded from an IP network to the IEEE 1394 network, by dynamically supporting the diverse A/V stream formats, codecs, transmission protocols, transmission control protocols, and so on, of the data networks, so as to enable users to watch the A/V streams of data networks on a display device connected to the IEEE 1394 network.

It will be understood that the methods and structures embodying the invention are shown by way of illustration only and not as a limitation of the invention. It will be understood by those of ordinary skill in the art that various changes in form and details may be made to the present invention without departing from the spirit and scope of the invention as defined by the following claims. Therefore, the scope of the invention is given by the appended claims, rather than the preceding description, and all variations and equivalents which fall within the range of the claims are intended to be embraced therein.

What is claimed is:

1. An A/V stream-forwarding system, comprising:
a media server providing A/V streams and having an interface for a data network;
a transcoder receiving the provided A/V streams through the data-network interface, and transcoding the A/V streams into A/V streams in a predetermined format supported by an IEEE 1394 network; and
a display device receiving and reproducing the transcoded A/V streams from the transcoder
wherein the media server comprises:
a storage unit storing A/V files and mobile codes; and
a mobile code-providing unit providing predetermined resources in a mobile-code format in response to the display device or the transcoder requesting the predetermined resources; and
wherein the mobile codes comprise a user interface, a format parser, a codec, a transmission protocol, and a transmission control protocol created in a JAVA language.

2. The system as claimed in claim 1, wherein the media server further comprises:
a first device information-providing unit providing the display device with device information of the media server;
an A/V stream-providing unit converting the A/V files of the storage unit into A/V streams when the transcoder requests A/V stream transmission, and providing the transcoder with the converted A/V streams; and a first IP network interface unit performing IP-network communications with the transcoder.

3. The system as claimed in claim 2, wherein, in response to a request for resources from the transcoder, the mobile code-providing unit provides the transcoder with a format parser, codec, transmission protocol, and transmission control protocol that the media server has.

4. The system as claimed in claim 2, wherein, if the display device requests a user interface, the mobile code-providing unit provides a predetermined user interface having a content-searching function.

5. The system as claimed in claim 2, wherein the transcoder comprises:
- a second device information-providing unit providing the display device with device information of the transcoder;
- a UI-providing unit providing a predetermined user interface upon a request from the display device;
- an A/V stream-processing unit receiving and processing a request of the display device for A/V streams, and, if the transcoder is re-configured based on resources that the media server supports, requesting A/V stream transmission from the media server;
- an A/V stream-converting unit transcoding predetermined A/V streams provided by the media server into MPEG2 transport streams; and
- an A/V stream-transmitting unit sending the transcoded MPEG2 transport streams to the display device.

6. The system as claimed in claim 5, wherein device information of the transcoder comprises a IEEE 1394 network address and a list of services for the transcoder.

7. The system as claimed in claim 5, wherein the A/V stream-processing unit requests a list of resources that the media server can support, checks whether the transcoder has the list of resources, and requests resources that the transcoder does not have from the media server based on a result of the check.

8. The system as claimed in claim 5, wherein the transcoder further comprises a transcoding device-reconfiguring unit reconfiguring the transcoder to perform transcoding based on predetermined resources that the media server supports.

9. The system as claimed in claim 5, wherein the A/V stream-converting unit decodes A/V streams of the media server, provided in a predetermined format, into raw data by using a predetermined codec that the media server supports, stores the raw data in a buffer, and encodes the raw data into the MPEG2 transport streams.

10. The system as claimed in claim 5, wherein the transcoder comprises: an IEEE 1394 network interface unit providing an interface to the display device; an IP network interface unit providing an interface to the media server; and
- an IP packet-forwarding unit forwarding IP packets from the display device to the media server or vice versa.

11. The system as claimed in claim 5, wherein the predetermined user interface provides functions necessary for the display device to request A/V streams from the media server.

12. The system as claimed in claim 1, wherein the display device comprises:
- a device search unit searching for a media server that provides A/V streams; a UI-requesting/processing unit requesting the media server and the transcoder for a user interface necessary for controlling respective devices, and running on a virtual machine the user interface provided by the media server and the transcoder;
- an A/V stream request unit requesting the transcoder for predetermined A/V streams;
- an A/V stream reception/reproduction unit decoding and reproducing the predetermined A/V streams received from the transcoder; and
- a display unit displaying the reproduced predetermined A/V streams on a screen.

13. The system as claimed in claim 12, wherein the user interface from the media server comprises a content search function.

14. The system as claimed in claim 12, wherein the user interface provided from the transcoder comprises functions necessary to request A/V streams from the media server.

15. The system as claimed in claim 12, wherein, if the transcoder is requested for the predetermined A/V streams, the A/V stream request unit provides the transcoder with information of an IEEE 1394 network address of the display device, an IP address of a media server storing desired contents, and contents desired for reproduction.

16. The system as claimed in claim 12, wherein the predetermined A/V streams are the MPEG2 transport streams.

17. The system as claimed in claim 12, wherein the display device further comprises an IEEE 1394 network interface unit performing interface with the transcoder.

18. A media server comprising:
- a first device information-providing unit providing a display device with device information of the media server;
- a storage unit storing A/V files and mobile codes;
- a mobile code-providing unit providing predetermined resources in a mobile-code format in response to a request from the display device or a transcoder;
- an A/V stream-providing unit converting the A/V files of the storage unit into A/V streams and providing the transcoder with the converted A/V streams in response to a request of the transcoder for an A/V stream transmission; and
- a first IP network interface unit performing IP-network communications with the transcoder,
- wherein the mobile codes comprise a user interface, a format parser, a codec, a transmission protocol, and a transmission control protocol created in a JAVA language, wherein the mobile codes are resources supported by the media server.

19. The media server as claimed in claim 18, wherein the mobile code- providing unit provides the transcoder with a format parser, codec, transmission protocol, and transmission control protocol, from the media server in response to a request from the transcoder.

20. The media server as claimed in claim 18, wherein the mobile code- providing unit provides a predetermined user interface having a content-searching function in response to a request from the display device.

21. A transcoder comprising:
- a device information-providing unit providing a display device with device information of the transcoder;
- a UI-providing unit providing a predetermined user interface in response to a request from the display device;
- an A/V stream-processing unit receiving and processing a request for A/V streams from the display device, and, requesting the media server for AN stream transmission when the transcoder is re-configured based on resources supported by a media server supports;
- an A/V stream-converting unit transcoding predetermined A/V streams provided by the media server into MPEG2 transport streams;
- an A/V stream-transmitting unit sending the transcoded MPEG2 transport streams to the display device,
- wherein the media server provides predetermined resources in a mobile-code format to the transcoder when the transcoder requests the predetermined resources from the media server, wherein the mobile codes comprise a user interface, a format parser, a codec, a transmission protocol, and a transmission control protocol created in a JAVA language.

22. The transcoder as claimed in claim 21, wherein device information of the transcoder comprises a IEEE 1394 network address and a list of services for the transcoder.

23. The transcoder as claimed in claim 21, wherein the A/V stream-processing unit requests a list of resources supported by the media server, checks whether the transcoder has the list of resources, and, based on the check, requests resources missing in the transcoder from the media server.

24. The transcoder as claimed in claim 21, further comprising:
a transcoding device-reconfiguring unit reconfiguring the transcoder to perform transcoding based on predetermined resources supported by the media server.

25. The transcoder as claimed in claim 21, wherein the A/V stream-converting unit decodes A/V streams of the media server, in a predetermined format, into raw data by using a predetermined codec supported by the media server, stores the raw data in a buffer, and encodes the raw data into the MPEG2 transport streams.

26. The transcoder as claimed in claim 21, further comprising:
an IEEE 1394 network interface unit providing interface with the display device;
an IP network interface unit providing interface with the media server; and
an IP packet-forwarding unit forwarding IP packets from the display device to the media server or vice versa.

27. The transcoder as claimed in claim 21, wherein the predetermined user interface provides functions necessary for the display device to request A/V streams from the media server.

28. An A/V stream-forwarding method, comprising:
requesting A/V stream transmission relating to certain contents;
transcoding A/V streams of a media server into predetermined A/V streams supported by an IEEE 1394 network, based on predetermined resources supported by the media server, and sending the predetermined A/V streams; and
decoding and reproducing the transcoded predetermined A/V streams on a screen, wherein the media server provides predetermined resources in a mobile-code format in response to a request, wherein the mobile codes comprise a user interface, a format parser, a codec, a transmission protocol, and a transmission control protocol created in a JAVA language.

29. The method as claimed in claim 28, wherein the predetermined resources are a parser for a predetermined A/V format, codec, transmission protocol, and transmission control protocol, which are supported by the media server.

30. The method as claimed in claim 28, wherein said requesting of the A/V stream transmission comprises:
sending device information of the transcoder to the display device, wherein the transcoder and the display device are connected to each other;
searching for a media server which provides A/V streams; providing the device information from a media server found in the searching;
searching for and selecting certain contents desired for reproduction by using a user interface provided by the media server for contents search; and
requesting for A/V streams of the certain contents desired for reproduction by using a user interface provided by the transcoder.

31. The method as claimed in claim 28, wherein said transcoding comprises:
requesting for a list of resources supported by the media server;
checking whether the transcoder has the resources, if the list of resources supported by the media server is provided in response to the request;
based on said checking, requesting resources, which the transcoder does not have, out of the resources supported by the media server;
re-configuring the transcoder if the media server provides the transcoder with predetermined resources in response to the request, and requesting for A/V stream transmission; and
transcoding the received A/V streams by using a predetermined codec supported by the media server if the A/V streams are transmitted.

32. The method as claimed in claim 28, wherein the A/V stream-transcoding decodes the received A/V streams into raw data by using the predetermined codec supported by the media server, stores the raw data, and encodes the raw data into MPEG2 transport streams.

* * * * *